United States Patent Office 3,129,217
Patented Apr. 14, 1964

3,129,217
DERIVATIVES OF 6-(9-ANTHRAMIDO)
PENICILLANIC ACID
Frank Peter Doyle, Betchworth, Surrey, and John Herbert Charles Nayler, Dorking, Surrey, England, assignors to Beecham Group Limited, Brentford, England, a British company
No Drawing. Filed Aug. 16, 1960, Ser. No. 49,851
Claims priority, application Great Britain, Aug. 19, 1959
6 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment especially of infectious diseases caused by Gram-positive bacteria, and, more particularly, relates to novel 6-(9-anthramido) penicillanic acid and nontoxic salts thereof.

Antibacterial agents such as benzylpenicillin have proved highly effective in the past in the therapy of infections due to Gram-positive bacteria but such agents suffer from the serious drawbacks of being unstable in aqueous acid, e.g., upon oral administration, and of being ineffective against numerous so-called resistant strains of bacteria, e.g., penicillin-resistant strains of *Staphylococcus aureus* (*Micrococcus pyrogenes* var. *aureus*). In addition, benzylpenicillin is not an effective agent against many bacteria which produce penicillinase. Many of the compounds of the present invention, in addition to their potent antibacterial activity, exhibit resistance to destruction by acid or by penicillinase or are effective against benzylpenicillin-resistant strains of bacteria or inhibit benzylpenicillinase and thus potentiate the action of benzylpenicillin when admixed therewith and are safe for use in patients who cannot be given benzylpenicillin because they exhibit allergic reactions thereto.

There is provided, according to the present invention, a member selected from the group consisting of an acid having the formula

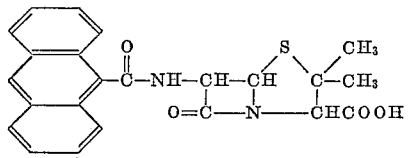

and nontoxic salts thereof, including nontoxic metallic salts such as sodium, potassium, calcium and aluminum, the ammonium salt and substituted ammonium salts, e.g., salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidines, e.g., N-ethylpiperidine, and other amines which have been used to form salts with benzylpenicillin. Also included within the scope of the present invention are easily hydrolysed esters which are converted to the free acid form by chemical or enzymatic hydrolysis.

The products of the present invention are prepared by reaction of 6-aminopenicillanic acid, preferably in the form of a neutral salt such as the sodium salt or the triethylamine salt, with an acid chloride having the formula:

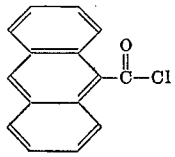

or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid.

Thus, an elegant procedure for preparing a compound of the present invention by way of a mixed anhydride with ethoxy- or isobutoxy-carbonic acid comprises mixing 0.01 mole of an acid (whose acid chloride is set forth above), 0.01 mole isobutyl chloroformate and 0.011 mole tertiary hydrocarbonyl or aliphatic amine such as triethylamine in an anhydrous, inert and preferably water-miscible solvent such as p-dioxane (e.g., 20 ml.) and if desired 2 ml. pure, dry acetone for about thirty minutes in the cold, e.g., at about 4° C. To this solution of the mixed anhydride there is then added a chilled solution of 0.01 mole 6-aminopenicillanic acid, and 0.01 mole tertiary hydrocarbonyl amine, e.g., triethylamine, in, for example, 20 ml. of a solvent such as water. The reaction mixture is stirred for a period of an hour or so to form the substituted ammonium salt of the desired product. The mixture may then, if desired, be extracted at alkaline pH (such as pH 8; aqueous sodium bicarbonate may be used, for example, if necessary to adjust the pH) with a water-immiscible solvent such as ether to remove unreacted starting materials. The product in the aqueous phase is then converted to the free acid, preferably in the cold under a layer of ether by the addition of dilute mineral acid, e.g., 5 N $H_2SO_4$ to pH 2. The free acid is then extracted into a water-immiscible, neutral organic solvent such as ether and the extract is washed with water quickly in the cold, if desired, and then dried, as with anhydrous $Na_2SO_4$. The product in the ethereal extract in its free acid form is then converted to any desired metal or amine salt by treatment with the appropriate base, e.g., a free amine such as procaine base or a solution of potassium 2-ethylhexanoate in dry n-butanol. These salts are usually insoluble in solvents such as ether and can be recovered in pure form by simple filtration.

Another method of preparing an ethereal solution of the acid form of a compound of the present invention comprises preparing a solution in 20 ml. water of 0.00463 mole 6-aminopenicillanic acid and 1.56 gm. sodium bicarbonate, adding 0.00476 mole of an acid chloride whose formula is set forth above and shaking vigorously at room temperature, e.g., for twenty to sixty minutes. The mixture is then extracted with ether to remove unreacted or hydrolyzed starting materials. The solution is then acidified (preferably in the cold) to pH 2, as with dilute sulfuric acid, and the free acid form of the product is extracted into either (e.g., two portions of 25 ml.). This ethereal extract is dried, as with anhydrous sodium sulfate, and the drying agent is removed to leave a dry ethereal solution from which the product is easily isolated, preferably in the form of an ether-insoluble salt such as the potassium salt. This procedure is used when the acid chloride reacts with a primary amaine more rapidly than it does with water, as determined by simple test. In this procedure the acid chloride may be replaced by an equimolar amount of the corresponding acid bromide or acid anhydride.

Since some of the antibiotic substances obtained by the process of this invention are relatively unstable compounds which readily undergo chemical changes resulting in the loss of an antibiotic activity, it is desirable to choose reaction conditions which are sufficiently moderate to avoid their decomposition. The reaction conditions chosen will, of course, depend largely upon the reactivity of the chemical reagent being used. In most instances, a comprombise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example, a solution of sodium bicarbonate, or a sodium phosphate buffer. In addition to the use of aqueous media for the reaction, including filtered fermentation broths or aqueous solutions of crude 6-aminopenicillanic acid, use can be made of organic solvents which do not contain reactive hydrogen atoms. Examples of such inert solvents are dimethylformamide, dimethylacetamide, chloroform, acetone, methyl isobutyl ketone and dioxane. Frequently, it is highly satisfactory to add an aqueous solution of a salt of 6-aminopenicillanic acid to a solution of the acylating agent in an inert solvent and preferably in an inert solvent which is miscible with water, such as acetone or dimethylformamide. Vigorous stirring is, of course, advisable when more than one phase is present, e.g., solid and liquid or two liquid phases.

At the conclusion of the reaction, the products are isolated, if desired, by the techniques used with benzylpenicillin and phenoxymethylpenicillin. Thus, the product can be extracted into diethyl ether or n-butanol at acid pH and then recovered by lyophilization or by conversion to a solvent-insoluble salt, as by neutralization with an n-butanol solution of potassium 2-ethylhexanoate, or the product can be precipitated from aqueous solution as a water-insoluble salt of an amine or recovered directly by lyophilization, preferably in the form of a sodium or potassium salt. When formed as the triethylamine salt, the product is converted to the free acid form and thence to other salts in the manner used with benzylpenicillin and other penicillins. Thus, treatment of such a triethylamine compound in water with sodium hydroxide converts it to the sodium salt and the triethylamine may be removed by extraction, as with toluene. Treatment of the sodium salt with strong aqueous acid converts the compound to the acid form, which can be converted to other amine salts, e.g., procaine, by reaction with the amine base. Salts so formed are isolated by lyophilization or, if the product is insoluble, by filtration. A particularly elegant method of isolating the product as a crystalline potassium salt comprises extracting the product from an acidic, aqueous solution (e.g., pH 2) into diethyl ether, drying the ether and adding at least one equivalent of a solution of potassium 2-ethylhexanoate (e.g., 0.373 gm./ml.) in dry n-butanol. The potassium salt forms, precipitates, usually in crystalline form, and is collected by filtration or decantation.

6-aminopenicillanic acid is prepared according to Batchelor et al. (Nature 183, 257–258, January 24, 1959) or Belgian Patent 569,728.

The following examples will serve to illustrate this invention without limiting it thereto.

*Example*

To a mixture of 9-anthroic acid (6.66 g., 0.03 mol.) and thionyl chloride (8.6 g., 0.12 mol.) contained in a 100 ml. flask fitted with $CaCl_2$ protected reflux condenser, was added N,N-dimethylformamide (1 drop). After refluxing for 1 hour the solution was evaporated to dryness under reduced pressure, the residue dissolved in anhydrous benzene and the solution evaporated to dryness again. The crude acid chloride was then dissolved in anhydrous alcohol-free chloroform (50 ml.) and the solution added during ½ hour to a stirred mixture of 6-aminopenicillanic acid (6.48 g., 0.03 mol.) chloroform (75 ml.), and triethylamine (8.4 ml., 0.06 mol.). After stirring for an additional 1 hour, the solution was extracted with water (30 ml.) and enough 1 N.hydrochloric acid to give an aqueous phase of pH 2 (required 30 ml.). The chloroform phase was separated and extracted with enough 3% sodium bicarbonate solution to give an aqueous phase of pH 7 (required 80 ml.). An emulsion formed at this stage, so the whole mixture was evaporated to dryness at room temperature under high vacuum. The residue was washed by decantation with anhydrous ether (2 x 50 ml.) and dried over phosphorus pentoxide to give the sodium salt of 9-anthrylpenicillin (also called sodium 6-(9-anthramido) penicillinate) as a yellow powder (8.9 g.); purity (by hydroxylamine assay)=53%.

It inhibited Staph. Oxford at 0.5 mcg./ml., Staph. 1 at 2.5 mcg./ml., and Staph. 2 at 2.5 mcg./ml. Staph. 1 and Staph. 2 are each typical benzylpenicillin-resistant strains, i.e., the minimum inhibitory concentration toward each of them of benzylpenicillin was 50 mcg./ml.

We claim:
1. A member selected from the group consisting of the acid 6-(9-anthramido) penicillanic acid and its sodium, potassium, calcium, aluminum and ammonium salts and its nontoxic substituted ammonium salts with an amine selected from the group consisting of tri(lower)alkylamines, procaine, dibenzylamine, N-benzyl-beta-phenethylamine, 1-ephenamine, N,N'-dibenzylethylenediamine, dehydroabietylamine, N,N'-bis-dehydroabietylethylenediamine and N-(lower)alkylpiperidine.
2. 6-(9-anthramido)penicillanic acid.
3. Potassium 6-(9-anthramido) penicillinate.
4. Sodium 6-(9-anthramido) penicillinate.
5. Triethylammonium 6-(9-anthramido) penicillinate.
6. Procaine 6-(9-anthramido) penicillinate.

References Cited in the file of this patent
UNITED STATES PATENTS

| | | |
|---|---|---|
| 2,479,297 | Behrens et al. | Aug. 16, 1949 |
| 2,941,995 | Doyle et al. | June 21, 1960 |

FOREIGN PATENTS

| | | |
|---|---|---|
| 569,728 | Belgium | Nov. 15, 1958 |